United States Patent
Chang et al.

(10) Patent No.: US 7,451,483 B2
(45) Date of Patent: Nov. 11, 2008

(54) VLAN ROUTER WITH FIREWALL SUPPORTING MULTIPLE SECURITY LAYERS

(75) Inventors: Kyusun Chang, Austin, TX (US); John Alan Mims, Round Rock, TX (US); Allen Keith Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 10/682,402

(22) Filed: Oct. 9, 2003

(65) Prior Publication Data

US 2005/0081058 A1    Apr. 14, 2005

(51) Int. Cl.
*H04L 9/32* (2006.01)
*G06F 17/00* (2006.01)

(52) U.S. Cl. ............... 726/15; 726/1; 726/11; 726/13

(58) Field of Classification Search ......... 726/11, 726/12, 13
See application file for complete search history.

(56) References Cited

U.S. PATENT DOCUMENTS

| | | | |
|---|---|---|---|
| 5,828,846 A * | 10/1998 | Kirby et al. | 709/238 |
| 6,298,445 B1 | 10/2001 | Shostack et al. | 713/201 |
| 6,301,668 B1 | 10/2001 | Gleichauf et al. | 713/201 |
| 6,477,651 B1 | 11/2002 | Teal | 713/200 |
| 6,496,948 B1 | 12/2002 | Smorodinsky | 714/37 |
| 6,571,283 B1 | 5/2003 | Smorodinsky | 709/220 |
| 6,728,885 B1 * | 4/2004 | Taylor et al. | 726/24 |
| 6,785,728 B1 * | 8/2004 | Schneider et al. | 709/229 |
| 6,976,089 B2 * | 12/2005 | Na et al. | 709/242 |
| 7,076,650 B1 * | 7/2006 | Sonnenberg | 713/151 |
| 7,093,280 B2 * | 8/2006 | Ke et al. | 726/3 |
| 7,107,612 B1 * | 9/2006 | Xie et al. | 726/13 |
| 2002/0073337 A1 * | 6/2002 | Ioele et al. | 713/201 |
| 2002/0165949 A1 * | 11/2002 | Na et al. | 709/223 |
| 2003/0005331 A1 * | 1/2003 | Williams | 713/201 |
| 2003/0041266 A1 * | 2/2003 | Ke et al. | 713/201 |
| 2003/0051165 A1 * | 3/2003 | Krishnan et al. | 713/201 |
| 2003/0196108 A1 * | 10/2003 | Kung | 713/200 |
| 2006/0209836 A1 * | 9/2006 | Ke et al. | 370/392 |

* cited by examiner

*Primary Examiner*—Christian LaForgia
(74) *Attorney, Agent, or Firm*—Duke W. Yee; David A. Mims, Jr.; Rudolf D. Siegesmund

(57) ABSTRACT

A router containing a firewall capable of supporting a plurality of different security levels. The router of the present invention creates a plurality of Virtual Local Area Networks (VLANs) using a network switch. The VLAN Rules Table (VRT) allows a network administrator to designate a trust level for each VLAN. The trust level may be different for every VLAN and the administrator may designate different rules for each VLAN. The Security Program (SP) analyzes each packet passing through the firewall and determines if the packet is permitted under the rules for the VLAN trust level. An alterative embodiment in which the switch in the router is divided into a plurality of sub-switches is also disclosed. In the alternative embodiment, the firewall need only compare the packet to rules which were not applied in the lower trust levels, eliminating the redundant rules from the comparison process.

7 Claims, 5 Drawing Sheets

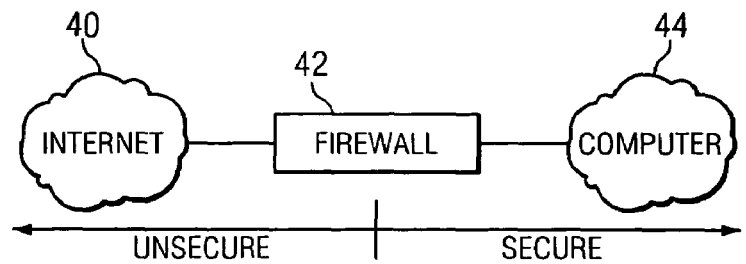
FIG. 1
(PRIOR ART)
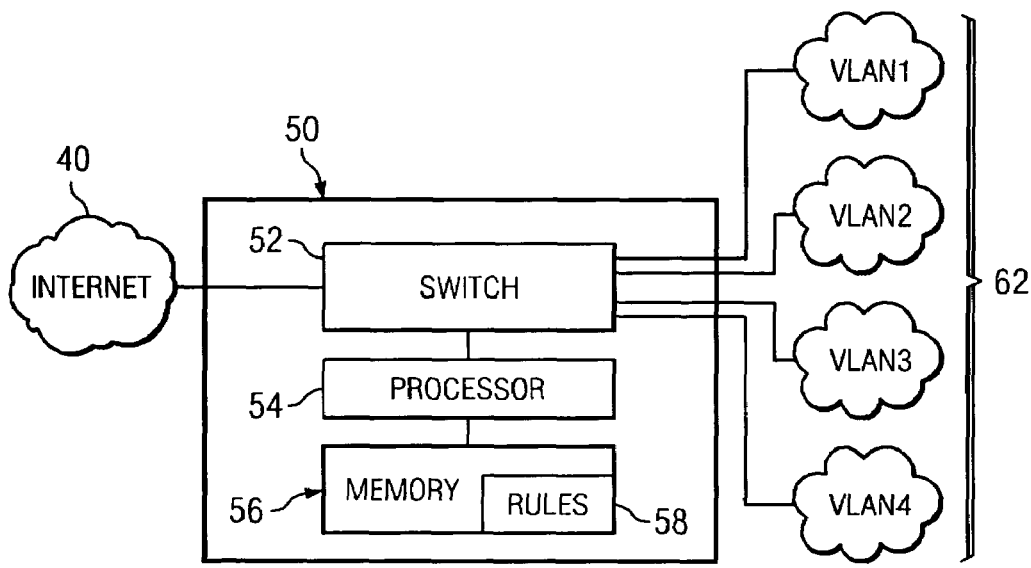
FIG. 2
(PRIOR ART)
| LOCATION | IP ADDRESS | TRUST LEVEL | RULES |
|----------|------------|-------------|-------|
| INTERNET | 192.35.232.711 | 0 | N/A |
| VLAN1 | 10.10.0.98 | 25 | 1 |
| VLAN2 | 10.11.0.98 | 50 | 1,2 |
| VLAN3 | 10.12.0.98 | 75 | 1,2,3 |
| VLAN4 | 9.3.31.98 | 100 | 1,2,3,4,5 |
FIG. 5

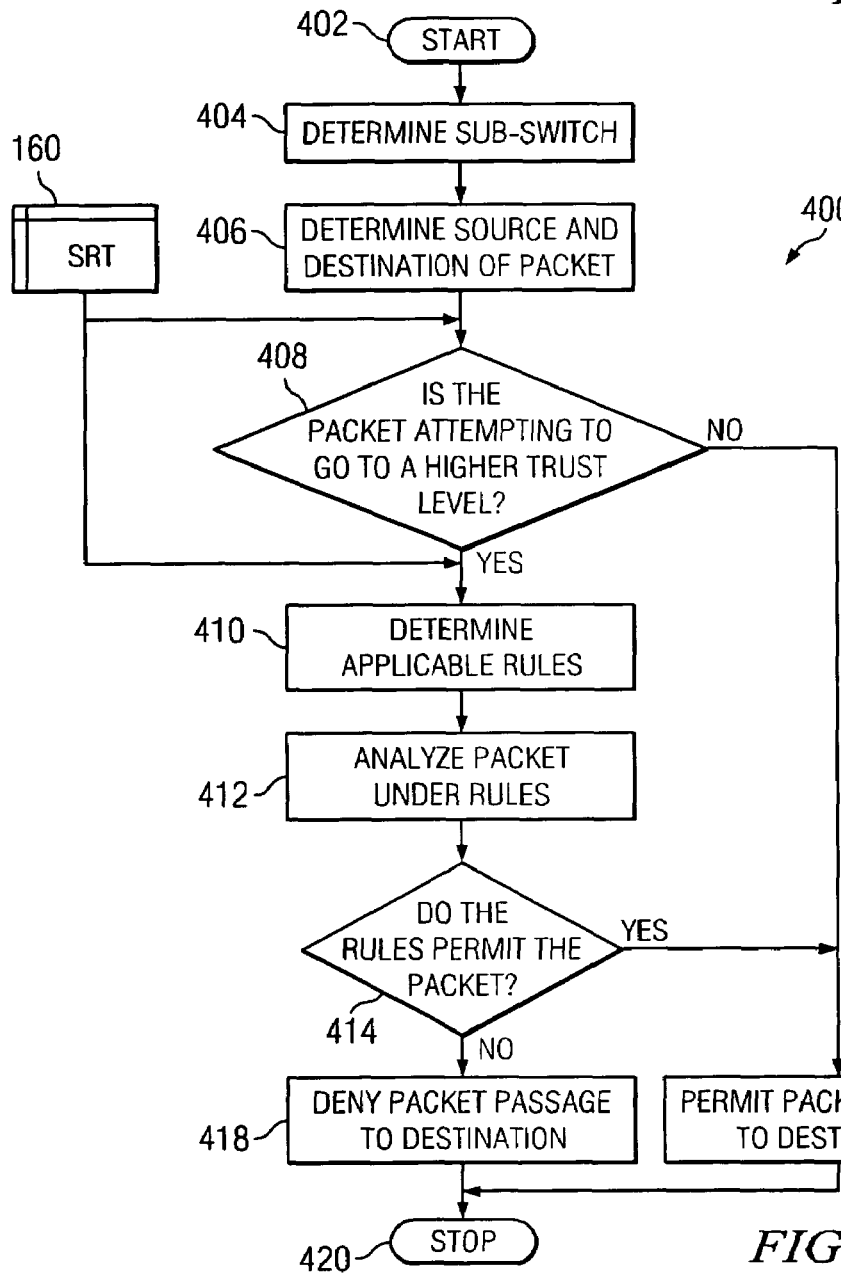

VLAN ROUTER WITH FIREWALL SUPPORTING MULTIPLE SECURITY LAYERS

FIELD OF THE INVENTION

The present invention is directed generally to a security apparatus for a computer network and specifically to a firewall for a plurality of networks with different security levels.

BACKGROUND OF THE INVENTION

A packet is a discrete amount of data transmitted between computers. Packets are transmitted from one computer to another computer using a protocol. Transmission Control Protocol (TCP) is a common protocol and governs the breakup, transmission, reassembly, and verification of the complete messages from one computer to another via Internet Protocol (IP) addresses. Many other types of protocols exist including Simple Mail Transfer Protocol (SMTP), Point to Point Protocol (PPP), Internet Control Message Protocol (ICMP), and User Datagram Protocol (UDP). Packets contain a header containing the IP source address, the IP destination address, the type of protocol (i.e. TCP, UDP, or ICMP), the TCP or UDP source port, the TCP or UDP destination port, and the ICMP message type. Use of protocols to transmit packets is well known in the art.

Firewalls are used in designing and building computer networks and are also well known in the art. A firewall is a device that filters data between two computers or networks to insure that one computer or network is more secure than the other computer or network. Firewalls are divided into one of two categories depending on their function. Packet filtering firewalls are used when connecting to the Internet to keep worms and viruses away from the protected computers. Proxy firewalls are used to monitor, control, and record outbound traffic to the Internet. The traffic consists of packets transmitted from one computer or network to another computer or network.

The internal structure of a packet filtering firewall contains a switch connected to two computers or networks and a set of rules stored in memory. When one computer or network attempts to transmit a packet through a firewall to another computer or network, the firewall analyzes the packet and determines if the rules in the firewall permit or deny passage of the packet. The rules are specific to the packets and are defined by security policies. Policies are broader than rules and define what type of access the protected computer should have. For example, if the security policy were to prohibit access to pornographic web sites, then the rules would prohibit X-rated material, vulgar words, and so forth. While the security policies tend to broadly define the limits of the computer's access to the Internet, each rule is very specific in the type of packet permitted or denied from being transferred across the firewall. As an example, a very simple set of rules would look like:

TABLE 1

Sample Rules

| Rule | Action | Protocol | Source | Destination |
| --- | --- | --- | --- | --- |
| 1 | Permit | UDP | Any | 10.0.0.1 |
| 2 | Deny | UDP | Any | 10.0.0.2 |
| 3 | Permit | SMTP | 10.0.0.0 | 10.0.0.255 |
| 4 | Permit | IP | Any | 10.0.0.3 |
| 5 | Deny | IP | Any | Any |

Generally, if the packet is not permitted by one of the rules, the packet is denied. Because of the technical and complex nature of rules, the creation and order of rules is best accomplished by a person of ordinary skill in the art.

FIG. 1 is an illustration of the security configuration associated with a firewall. In FIG. 1, firewall 42 is installed between Internet 40 and computer 44. As can be seen in FIG. 1, the prior art only allows two security zones: a secured zone and an unsecured zone. In the example depicted in FIG. 1, firewall 42 analyzes packets transmitted between Internet 40 and computer 44 and blocks the transmission of packets denied by the rules in firewall 42. Every packet transmitted from Internet 40 to computer 44 is analyzed by firewall 42 and is compared to all of the rules until the packet is permitted or denied by a rule. If the packet is not permitted under one of the rules, the packet is denied.

A router is a device which connects a plurality of computers or computer networks to the Internet. Routers are also well known in the art. Because routers and firewalls are frequently used together, it is common for packet filtering firewalls to be installed within routers. FIG. 2 is an illustration of a prior art router with a firewall installed. Router 50 is connected to Internet 40, and a plurality of Virtual Local Area Networks (VLANs) 62. VLANs 62 are computer networks that communicate with each other and have access to Internet 40. Router 50 contains switch 52, processor 54, and memory 56 containing rules 58. Switch 52 contains a plurality of network interface cards and is the actual connection between Internet 40, processor 54, and VLANs 62. When Internet 40 attempts to transmit a packet through router 50 to one of the VLANs 62, processor 54 analyzes the packet and determines if rules 58 permit the packet. If rules 58 permit the packet, then the packet is transmitted to its destination. If the rules 58 deny the packet, then the packet is blocked and sent back to its source or deleted.

One of the shortcomings of prior art firewalls is that the firewalls only create two security levels: a secured area and an unsecured area. However, when configuring a complicated computer network, such as an intranet, many different security levels are desired. In order to achieve multiple security levels, a network administrator must install a plurality of prior art routers and/or firewalls in the intranet. FIG. 3 illustrates a simplified network configuration in which a plurality of security levels are obtained through multiple routers and/or firewalls. Internet 40 is generally considered unsecured and thus receives a security level of 0. Packets must pass through router/firewall 50 before reaching network servers 70. The network is protected by firewall 50 and thus receives a security level of 1. Network servers 70 serve a plurality of workstations 72. While the security level for network servers 70 may be the same as workstations 72, an increased security level is desired for administrative and backup networks. Therefore, packets must pass through an additional router/firewall 50 with additional rules before reaching backup servers 74. Because packets must pass through backup firewall 50 with additional rules, backup servers 74 have a security level of 2. Finally, the administrator usually desires that administrative networks receive the highest level of protection. Therefore, packets must pass thorough router/firewall 50 with the most stringent rules before reaching administrative servers 76. Because of the stringent rules in administrative firewall 50, administrative servers 76 are given a security level of 3.

One of the problems with the computer network configuration depicted in FIG. 3 is that each router/firewall is expensive and time consuming to install, configure, test, and maintain. The process of installing, configuring, testing, and maintaining the firewall is substantially dependent on the number of individual firewalls. The number of firewalls cannot be reduced using the prior art firewalls because the prior art firewalls do not allow the network administrator to use a single firewall to create multiple security levels. Therefore, a need exists for a method of reducing the number of firewalls in a computer network configuration.

The prior art firewalls are limited in that an individual firewall is needed for each security boundary. Even with the prior art routers supporting multiple computer networks, the firewall within the router is not able to create different security levels within the individual computer networks. Because a router can connect to multiple computer networks, it would be useful if the firewall could create multiple security levels in the computer networks because a network administrator could then utilize a single firewall where a plurality of firewall were previously required. In other words, the network administrator will have created a plurality of virtual firewalls from a single firewall. Therefore, a need exists in the art for a firewall that allows a network administrator to create multiple security levels using a single firewall.

SUMMARY OF THE INVENTION

The present invention, which meets the needs identified above, is a router containing a firewall capable of supporting a plurality of different security levels. The router of the present invention creates a plurality of Virtual Local Area Networks (VLANs) using a network switch. The switch is connected to the firewall of the present invention which includes a processor capable of executing instructions from a memory. The memory contains a Configuration Program (CP), a Security Program (SP), a VLAN Rules Table (VRT), and the rules that the firewall applies to the packets. The CP configures the VRT and rules. The SP analyzes each packet passing through the firewall and determines if the packet is permitted under the rules. The SP allows packets permitted under the rules to pass to their destination and denies all other packets. The firewall of the present invention represents a significant improvement over the prior art in that the VRT allows a network administrator to designate a trust level for each VLAN. The trust level may be different for each VLAN and the administrator may designate different rules for each trust level. The administrator may also add, delete, or modify the rules or trust levels using the present invention. Thus, the present invention allows the administrator to utilize a single firewall where a plurality of firewalls were previously required.

In an alterative embodiment of the present invention, the switch in the router is divided into a plurality of sub-switches. Packets passing into the switch pass from one sub-switch to another until they reach a sub-switch connected to the packet's destination. At each sub-switch, the firewall analyzes the packet to determine if it is permitted under the rules for that particular sub-switch. When the packet is passed to a more secure sub-switch, the firewall need only compare the packet to the rules which were not applied in the lower trust levels. Thus, the invention eliminates the redundant rules from the comparison process at each sub-switch. The elimination of the redundant comparisons reduces the comparison time at each sub-switch and, therefore, the residence time of the packet in the firewall.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an illustration of the security levels in a prior art firewall;

FIG. 2 is an illustration of a prior art router with internal firewall;

FIG. 5 is an illustration of the VLAN Rules Table (VRT) of the present invention;

FIG. 9 is an illustration of the Sub-switch Rule Table (SRT) of the present invention; and FIG. 10 is an illustration of the Alternative Security Program (ASP) of the present invention.

DETAILED DESCRIPTION OF THE PREFERRED EMBODIMENT

As used herein, the term "analyze" shall mean to compare a packet to a list of rules associated with a trust level and determine if the rules permit or deny the packet.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "deny" shall mean to block transmission of a packet from a source to a destination at a firewall.

As used herein, the term "firewall" shall mean a system or device that enforces a security boundary between two or more computers or computer networks.

As used herein, the term "packet" shall mean a discrete quantity of data transmitted from a source to a destination.

As used herein, the term "permit" shall mean to allow transmission of a packet from a source, though a firewall, and to a destination.

As used herein, the term "policy" shall mean a set of rules governing acceptable use of computing resources, security practices, and operational procedures.

As used herein, the term "residence time" shall mean the time required for a firewall to analyze and either permit or deny a packet.

As used herein, the term "router" shall mean a system or device containing a firewall which connects a computer or computer network to another computer, another computer network, or the Internet.

As used herein, the term "rule" shall mean a criterion for permitting or denying passage of a packet from a source to a destination.

As used herein, the term "switch" shall mean a device capable of receiving a packet, allowing a firewall to analyze the packet, and forwarding the packet to the port associated with the packet's destination.

As used herein, the term "trust level" shall mean a security level associated with a particular set of rules in a firewall.

As used herein, the term "VLAN" is an acronym for "Virtual Local Area Network" and shall mean a computer network consisting of groups of hosts that are on physically different computer networks but that communicate as though they were on the same computer network. Separate VLANs are differentiated by different IP addresses.

Figure 3:
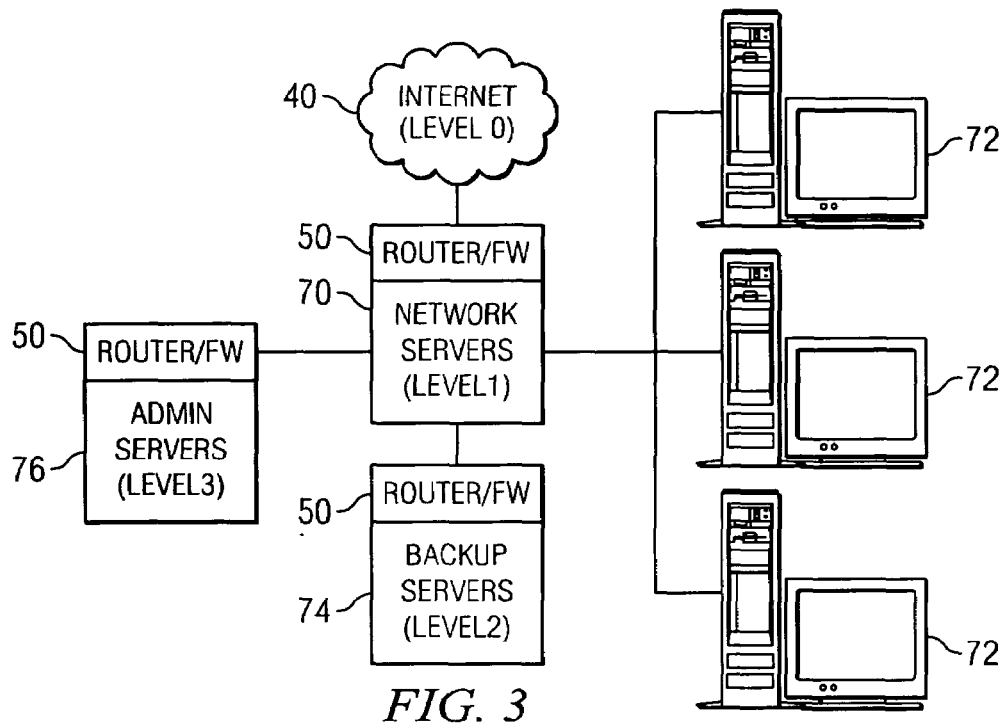
FIG. 3 is an illustration of a network configuration using prior art firewalls.
Figure 4:
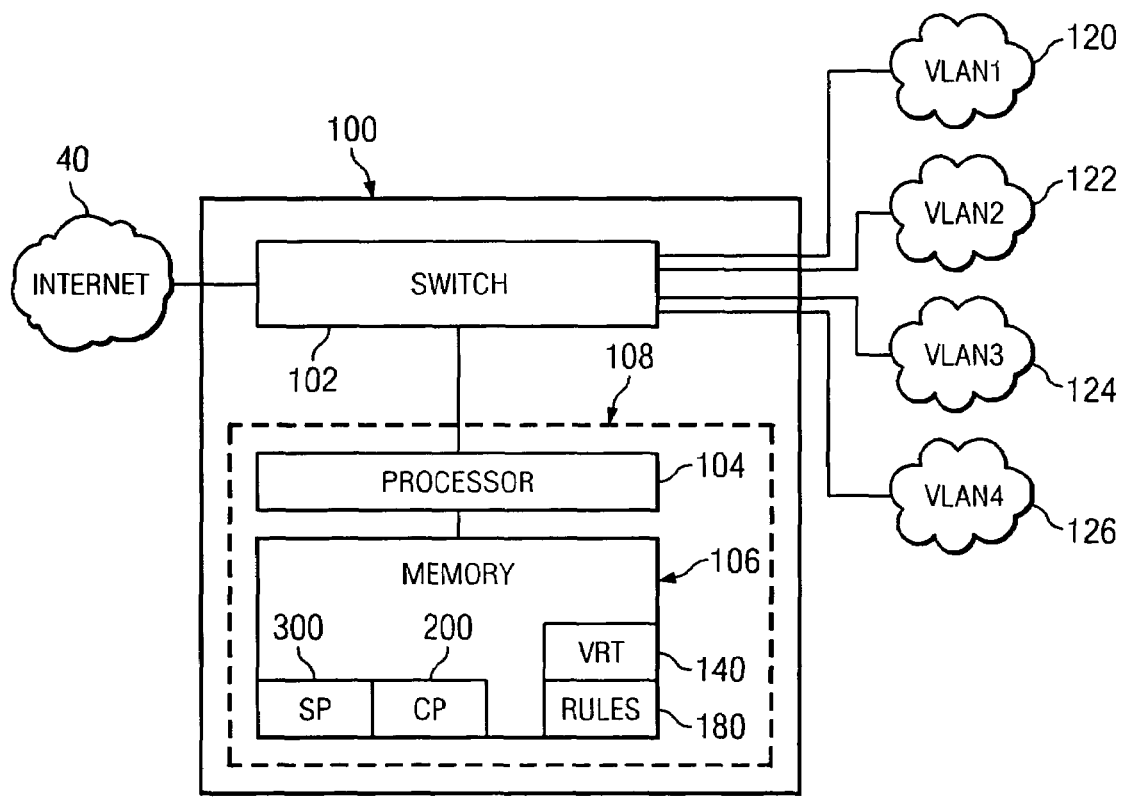
FIG. 4 is an illustration of the configuration of the firewall of the present invention.

The present invention is a router containing a firewall which creates a plurality of different security levels for a plurality of different VLANs. Turning to FIG. 4, router 100 is illustrated. Router 100 is connected to Internet 40, VLAN 120, VLAN 122, VLAN 124, and VLAN 126. Router 100 comprises switch 102 and firewall 108. Switch 102 contains a plurality of network interface cards to connect to the various computer networks. Firewall 108 comprises processor 104 which executes instructions from memory 106. Memory 106 contains Configuration Program (CP) 200, Security Program (SP) 300, VLAN Rules Table (VRT) 140, and rules 180. When packets attempt to pass between Internet 40, VLAN 120, VLAN 122, VLAN 124, and/or VLAN 126, switch 102 allows firewall 108 to analyze the packet to determine if the packet is permitted by rules 180 defined by VRT 140. The process for analyzing, permitting, and denying packets is illustrated in FIG. 6.

Turning to FIG. 5, VLAN Rules Table (VRT) 140 is a table specifying which rules are applied to packets destined for the VLANs. VRT 140 contains the location 142 of each VLAN and the Internet, the IP address 144 of each location, the trust level 146 associated with each location, and the rules 148 applied to packets going to the location. As can been seen in FIG. 5, VRT 140 specifies the rules to be applied at every trust level and thus every VLAN. A network administrator can configure VRT 140 with as many different trust levels and combinations of rules as desired. For example, the administrator can place two VLANs on trust level 50. The administrator could create an additional trust level 125 and place a fifth VLAN at that trust level. The administrator can modify the rules associated with the trust levels. The administrator can also delete rules associated with a trust level or delete an entire trust level. Persons of ordinary skill in the art are aware of methods for associating trust levels with a plurality of rules for a firewall.

Figure 6:
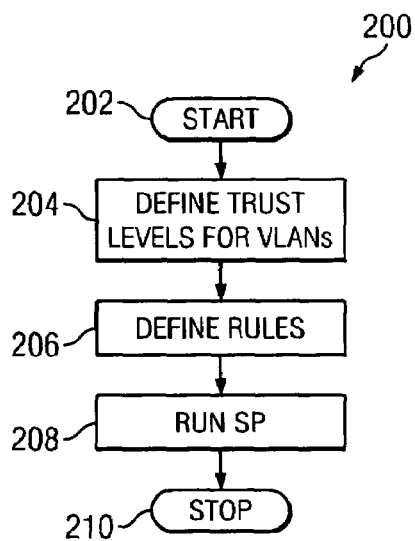
FIG. 6 is an illustration of the logic of the Configuration Program (CP) of the present invention.

Turning to FIG. 6, the logic of Configuration Program (CP) is illustrated. CP 200 is a program in which the network administrator configures the security levels within the firewall. CP 200 need only be run when the firewall is initially set up or whenever the administrator wants to add, delete, or modify the trust levels or rules associated with the trust levels. CP 200 starts (202) when invoked by the administrator. The administrator then defines the different trust levels for the VLANs (204). The administrator then defines the rules for the various trust levels (206). In defining the rules, the administrator creates a rules table, similar to table 1 above, then specifies which rules will be applied to which security levels. The rules table may be like VRT 140 in FIG. 5 or may be determined by a person of ordinary skill in the art. CP 200 then runs SP 300 (208) then ends (210).

Figure 7:
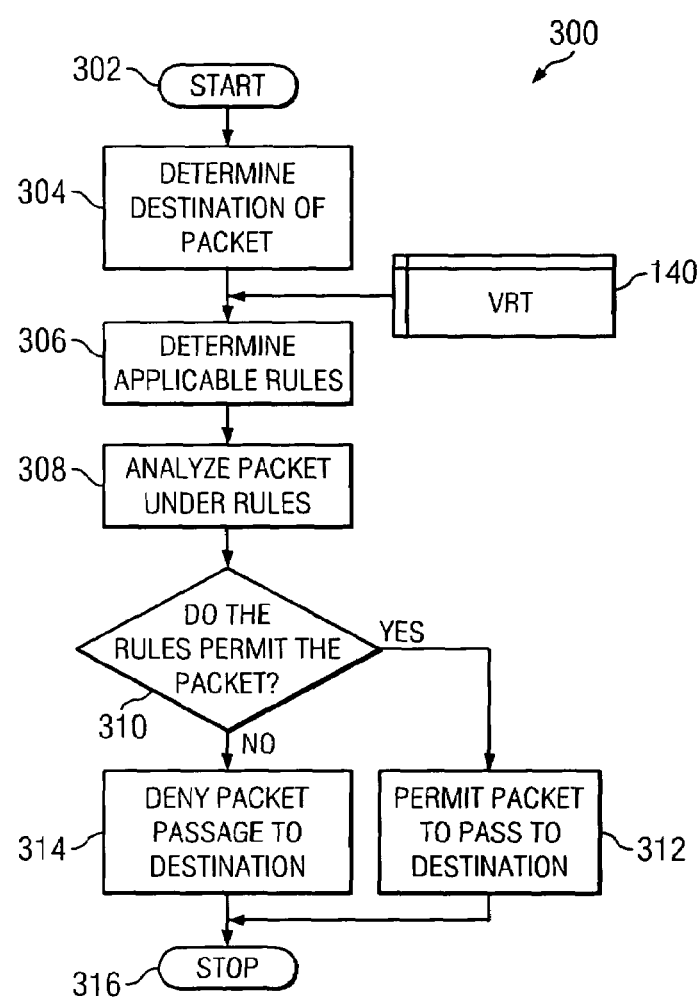
FIG. 7 is an illustration of the logic of the Security Program (SP) of the present invention.

Turning to FIG. 7, the logic of Security Program (SP) 300 is illustrated. SP 300 is a program which analyzes the transmission of packets through the switch and denies the packets that are not permitted by the rules. SP 300 starts (302) whenever a packet attempts to pass through the switch. SP 300 first determines the destination of the packet from the packet header (304). SP 300 then consults VRT 140 and determines the rules to apply to the packet based on the packet destination (306). SP 300 then analyzes the packet under the rules (308). In applying the rules to the packet, SP 300 determines whether the packet is permitted by the rules. If the rules do not expressly permit the packet, then the packet is denied. SP 300 then makes a determination whether the rules permit the packet (310). If the rules do not permit or deny the packet, SP 300 denies the packet passage to the packet's destination (314). SP 300 may then either return to the packet to the packet's source or delete the packet. If at step 310 the packet is permitted by the rules, then SP 300 permits the packet to pass to the packet's destination (312). SP 300 then ends (316).

Figure 8:
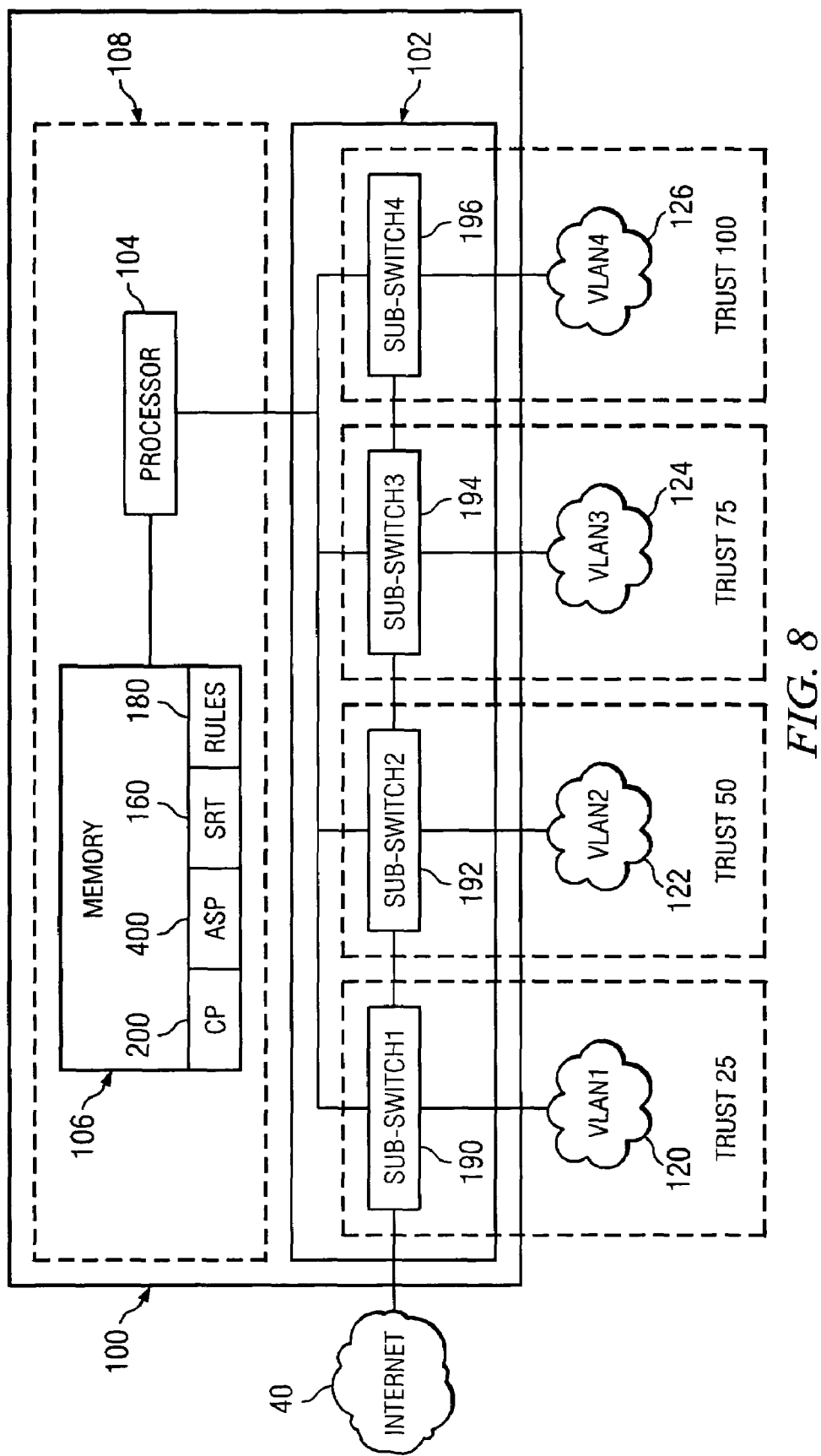
FIG. 8 is an illustration of an alternative embodiment of the configuration of the firewall of the present invention.

Turning to FIG. 8, an alternative embodiment of the present invention is illustrated. FIG. 8 depicts router 100 with firewall 108 containing processor 104 able to execute instructions from memory 106. Memory 106 contains CP 200, ASP 300, SRT 160, and Rules 180. Processor 104 is also connected to switch 102, which comprises sub-switch 190, sub-switch 192, sub-switch 194, and sub-switch 196. Each sub-switch contains a plurality of network interface cards to connect to the various computer networks. In the embodiment depicted in FIG. 8, each of the sub-switches is connected to a specific VLAN. Sub-switch 190 is connected to Internet 40, VLAN 120, and sub-switch 192. Sub-switch 192 is connected to sub-switch 190, VLAN 122, and sub-switch 194. Sub-switch 194 is connected to sub-switch 192, VLAN 124, and sub-switch 196. Sub-switch 196 is connected to sub-switch 194 and VLAN 126.

As can be seen in FIG. 8, each of the sub-switches falls into the trust level of the VLAN that the sub-switch is connected to. Thus, if a packet is attempting to go from sub-switch 190 to sub-switch 192, the packet must be permitted under one of the rules of the higher (i.e. more secure) trust level. Because the packet has already been permitted under one or more of the lower (i.e. less secure) trust levels, when attempting to go to a higher trust level, the packet need only be analyzed under the higher trust level rules. In other words, it would be redundant to analyze a packet attempting to pass from sub-switch 192 to sub-switch 194 to see if the packet has been permitted under the rules of sub-switch 192 because the packet must have been permitted by those rules in order to reach sub-switch 192. Thus, the invention need only determine if the packet is permitted under the rules for sub-switch 194 which are not utilized by sub-switch 192 or any of the lower security sub-switches. An example of this concept is illustrated in conjunction with FIG. 9 below.

Turning to FIG. 9, an example of Sub-switch Rules Table (SRT) 160 is illustrated. Similar to VRT 140, SRT 160 can be configured by CP 200. SRT 160 defines the relationship between sub-switches 162, trust levels 164, and rules 166. However, in contrast to VRT 140, each trust level in SRT 160 need only be associated with the rules that are not present in the lower trust levels. For example, sub-switch 3 is at trust level 75 and is associated with rule 3. Thus, a packet destined for VLAN 3 would have to arrive at sub-switch 1, 2, and 3 prior to being transferred to VLAN 3. When the packet is at sub-switch 3 attempting to go to VLAN 3, the firewall should analyze the packet under rules 1, 2, and 3. However, the present invention only analyzes the packet under rule 3 at sub-switch 3 because the packet will have already been permitted under rule 1 at sub-switch 1 and under rule 2 at sub-switch 2. Determining if the packet is permitted under rules 1 and 2 is unnecessary. Therefore, the invention need only determine if the packet is permitted under rule 3. The result of the arrangement depicted in FIGS. 8 and 9 is a reduction in the number of rules applied to a packet at a given trust level, which reduces the residence time of the packet in the firewall.

Turning to FIG. 10, the logic of Alternative Security Program (ASP) 400 is illustrated. ASP 400 is an example of the security program required to implement the firewall depicted in FIGS. 8 and 9. ASP 400 starts (402) whenever a packet is received by a sub-switch. ASP 400 determines at which sub-switch the packet is located (404). ASP 400 then determines the source and destination of the packet from the packet header (406). ASP 400 then determines if the packet is attempting to go to a higher trust level (408). In order to determine if the packet is attempting to go to a higher trust level, ASP 400 looks to SRT 160, the packet source, and the packet destination and determines if the packet source trust level is lower than the packet destination trust level. If the packet is not attempting to go to a higher trust level, ASP 400 proceeds to step 416. If the packet is attempting to go to a higher trust level, ASP 400 determines the rules to apply to the packet from SRT 160 (410). ASP 400 then analyzes the packet under the rules (412) and determines if the rules permit the packet (414). If the rules permit the packet, ASP 400 permits the packet to pass to the packet's destination, which may be via another sub-switch (416). If at step 414 the rules do not permit the packet, then ASP 400 denies the packet access to the packet's destination (418). ASP 400 then ends (420).

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. All equivalent relationships to those illustrated in the drawings and described in the specification are encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for analyzing a packet using a firewall which creates a plurality of trust levels for a plurality of computer networks, the method comprising:
   using a single router containing the firewall and a switch to service each of the plurality of computer networks by performing the steps of:
   determining a destination of the packet from a packet header;
   accessing a plurality of rules;
   determining the appropriate rules to use to analyze the packet;
   analyzing the packet using the rules;
   determining if the packet is permitted under the rules;
   responsive to a determination that the rules permit the packet, permitting the packet to pass to the destination only when the destination does not have a trust level higher than a trust level of a source of the packet;
   responsive to a determination that the rules deny the packet, denying the packet;
   wherein a trust level is a security level associated with a particular set of rules in the firewall; and
   wherein the trust level reduces the time required for the firewall to analyze and either permit or deny the packet.

2. The method of claim 1 further comprising: responsive to a determination that the rules do not permit or deny the packet, denying the packet.

3. The method of claim 1 wherein a table defines the relationship between the trust levels, the rules, and the computer networks.

4. A method for analyzing a packet using a firewall which creates a plurality of trust levels for a plurality of computer networks, the method comprising:
   using a single router containing the firewall and a plurality of sub-switches to service each of the plurality of computer networks by performing the steps of:
   determining a sub-switch location of a packet;
   determining a source and a destination of the packet from a packet header;
   determining if the packet is attempting to go to a destination with a higher trust level than a trust level of the source; and
   responsive to a determination that the packet is not attempting to go to a higher trust level, permitting the packet to pass the destination;
   wherein a trust level is a security level associated with a particular set of rules in the firewall; and
   wherein the trust level reduces the time required for the firewall to analyze and either permit or deny a packet.

5. The method of claim 4, wherein responsive to a determination that the packet is attempting to go to a higher trust level, the method further comprises:
   determining the appropriate rules to use to analyze the packet using the table;
   analyzing the packet using the rules;
   determining if the packet is permitted under the rules;
   responsive to a determination that the rules permit the packet, permitting the packet; and
   responsive to a determination that the rules deny the packet, denying the packet.

6. The method of claim 5 wherein the security program further comprises: responsive to a determination that the rules do not permit or deny the packet, denying the packet.

7. The method of claim 4 wherein the firewall further comprises: a table defining the relationship between the trust levels, the rules, and the computer networks.

* * * * *